United States Patent [19]

Meurs et al.

[11] Patent Number: 5,378,797
[45] Date of Patent: Jan. 3, 1995

[54] PROCESS FOR PREPARING ALIPHATIC POLYESTERS

[75] Inventors: Jan H. H. Meurs; Feike De Jong, both of Amsterdam, Netherlands

[73] Assignee: Shell Oil Company, Houston, Tex.

[21] Appl. No.: 131,513

[22] Filed: Oct. 4, 1993

[30] Foreign Application Priority Data

Oct. 22, 1992 [EP] European Pat. Off. ........ 92203256.0

[51] Int. Cl.$^6$ ............................................. C08G 63/83
[52] U.S. Cl. .................................. 528/283; 528/272; 528/275; 528/277; 528/299; 528/300
[58] Field of Search ............... 528/272, 275, 277, 283, 528/299, 300

[56] References Cited

U.S. PATENT DOCUMENTS 3,912,692 10/1975 Casey et al. .

FOREIGN PATENT DOCUMENTS

0287007A2 10/1988 European Pat. Off. .

*Primary Examiner*—Samuel A. Acquah

[57] ABSTRACT

Aliphatic polyesters are produced by the acylative ether cleavage of aliphatic monomers having at least one arylmethoxy group and at least one hydrocarbyl group. Alternatively, monomeric systems of aliphatic compounds having at least two arylmethoxy groups together with aromatic or aliphatic compounds having at least two halocarbonyl groups are used. Lewis acids are used to catalyze the reaction.

16 Claims, No Drawings

PROCESS FOR PREPARING ALIPHATIC POLYESTERS

BACKGROUND OF THE INVENTION

This invention relates to the preparation of aliphatic polyesters.

Many types of reactions can be used to synthesize polyesters. See, e.g., U.S. Pat. No. 3,912,692 disclosing a prior art use of a tin(II) catalyst to produce polyglycolide. The most important polyesterification reactions are those in which the molecular chain is built up by formation of an ester linkage at each step.

There are two primary types of such reactions: polyesterification reactions of bifunctional reactants (also called polycondensation reactions as water is deliberated) and ring-opening polymerization of cyclic esters. Both reactions occur until equilibrium is reached. Step-polyesterification and ring formation of cyclic esters are closely interrelated as they take place concurrently. This makes it difficult to produce high molecular weight polymers with sufficient purity for ordinary applications.

When producing aliphatic polyesters with a degree of polymerization of approximately 20 or below, it is normally sufficient to allow the water of reaction to be driven off at the temperature of reaction, with the assistance of stirring and the passage of a current of dry inert gas. Producing higher molecular weight polyesters, however, generally requires the use of azeotropic entrainment or reduced pressure to press the reactions forward.

Moreover, as these reactions proceed at relatively high temperatures, there is a risk of thermal degradation during the several hours that is usually required for the product to reach the desired molecular weight. For instance, polyesters of oxalic or malonic acid readily decarboxylate, 3-hydroxypropionic acids readily dehydrate, and cis-vinylene or cis-substituted alicyclic reactants readily isomerize or cross-link.

Where polyesterification is to occur by a ring opening mechanism instead of a step-polycondensation, different problems are encountered. First, these techniques require the use of expensive cyclic monomers. Moreover, the choice of cyclic monomers that may be used is limited. Cyclic monomers that transcend certain well known ring sizes will not undergo polyesterification in a commercially meaningful manner.

Another method of preparing polyesters is the reaction of a (bis)acyl chloride with a (bis)trimethylsilyl ether, producing trimethylsilyl chloride as coproduct. This reaction is described by Kricheldorf et al in both Polymer 23, 1821 (1982) and Macromol. Chem. 184, 475 (1983). This reaction is also carried out at high temperatures in either a melt or in an inert solvent. Here too, the process is relatively expensive due to the high cost of silylated compounds.

A bulk manufacturing process for producing high molecular weight aliphatic polyesters using less expensive starting materials and operating under safe and environmentally sound conditions using rather simple equipment is still needed. A resulting reduction in the cost of the aliphatic polyester is always welcome in the art. Consequently considerable research and development efforts have been made for an improved manufacturing process for these polyesters.

SUMMARY OF THE INVENTION

It is an object of this invention to provide a process for producing pure, high molecular weight aliphatic polyesters.

It is a further object of this invention to provide a relatively inexpensive process for producing aliphatic polyesters.

It is yet a further object of this invention to provide a process for producing aliphatic polyesters without resort to extreme reaction conditions.

In accordance with this invention aliphatic polyesters are produced by means of an acylative ether cleavage reaction conducted in the presence of a Lewis acid.

DETAILED DESCRIPTION OF THE INVENTION

Surprisingly, a new reaction has been found which permits high molecular weight aliphatic polyesters to be rapidly produced. Many of the polymers so produced have not been previously synthesized. For many others, no commercially feasible method was available to produce them prior to the present invention.

The invention herein disclosed and claimed provides a process for preparing aliphatic polyesters through acylative ether cleavage of monomeric reactants. In the process of this invention, ethereal monomers are brought into contact with a catalytic amount of a Lewis acid in an atmosphere that is inert to the reactants. The reaction takes place to yield high quality, high molecular weight aliphatic polyesters. Ordinary reaction means such as stirring or mixing, precipitation, filtration, and purification may be incorporated into the process as necessary as one of ordinary skill in the art would readily recognize.

Monomers used in the process are of two basic types. The first monomeric system includes aliphatic compounds containing at least one arylmethoxy group ($ArCR_1R_2O$), wherein Ar represents an aryl group and each R independently represents hydrogen or a hydrocarbyl group; and at least one halocarbonyl group

wherein x represents a halogen atom. A second monomeric system is comprised of aliphatic compounds containing at least two arylmethoxy groups, together with aromatic and/or aliphatic compounds containing at least two halocarbonyl groups.

In a preferred embodiment of the invention, each monomer is a bifunctional compound. When this is the case, a stochiometric amount of monomer yields a linear polyester having an even greater degree of polymerization than otherwise produced. However, even where bifunctional monomer is used, some monofunctional compounds may be added to moderate the degree of polymerization in the product.

In a preferred embodiment of the invention, a monomer containing one arylmethoxy group and one halocarbonyl group per molecule is used. Such a compound has the formula:

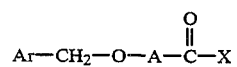

Formula I where Ar is an aryl group, X is chlorine or bromine, A is an aliphatic inert bridging group which may consist of a substituted or unsubstituted hydrocarbyl group. The group,

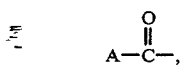

forms the backbone of the subsequently formed aliphatic polyester. The following is representative of a reaction involving this type of monomer:

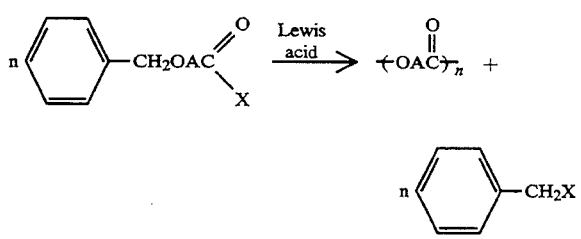

When a bifunctional compound is used as the monomer, a preferred monomer has the following formula:

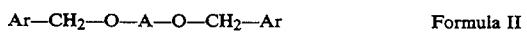     Formula II

Then a monomer as shown in Formula II is used, it is combined with a compound having Formula III as shown immediately below rather than having the

group as shown in Formula I:

     Formula III wherein Ar, A and X have the meaning defined hereinbefore, and B represents an aromatic or aliphatic inert bridging material. This bridging material contains a hydrocarbyl group and may be substituted or unsubstituted. The following is representative of a reaction involving this type of monomer:

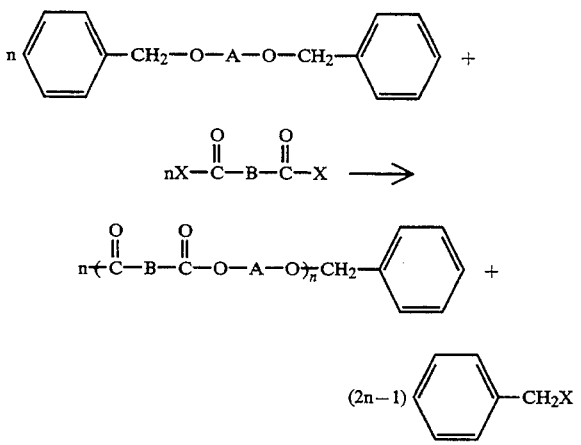

It has been found that both bridging materials A and B may have between 2 and 20 carbon atoms therein and may also contain up to 5 hetero atoms. Hetero atoms are those that are neither hydrogen nor carbon atoms. Preferably, these bridging materials will contain a total of 3 to 10 carbon atoms therein and may contain substituents.

In bridging group A, it is also possible to incorporate a hydrocarbyl group having a conjugated and/or aromatic system therein as long as such group is at least two carbon atoms away from the functional groups. When bridging group B is an aliphatic bridging hydrocarbyl group it may, but need not, be the same as A.

It is surprising that acylative ether cleavage of the compound containing the arylmethoxy group is selective enough to produce polyester alone given that each ether group has two carbon-oxygen bonds that could potentially be cleaved. Side reactions would ordinarily be expected. The presence of the halocarbonyl group would lead one to expect side reactions at those sites as well. If such side reactions did occur, the process would be quite useless, as oligomeric by-products would be too difficult to remove to make the process commercially attractive.

The literature has presupposed that these types of reactions are rather unselective. See e.g., European patent No. 287,007; J. Am. Chem. Soc., 90, 3878 (1968); Bull Soc. Chem. Fr., 2788 (1967); J. Chem. Soc., B, 7, 745-51 and 8, 856-9 (1986); Chem. Revs., 54, 615 (1954); and Synthesis, 249-181 (1980). Certainly, polymerization requiring propagation beyond a polymerization degree of at least 3 could hardly be expected. Nevertheless, the reactions of the instant invention have been found to proceed essentially without competing side-reactions when conducted according to the conditions disclosed and claimed herein.

Most of the monomers that are suitable for use in this process are commercially available or are made by adapting the standard production processes. For example, the compounds containing an arylmethoxy group are generally prepared by the Williamson synthesis (starting with e.g., benzyl bromide and an alcohol). The compounds containing a halocarbonyl group are generally prepared from the corresponding acids by reaction with thionyl halide, phosphorus trihalide or phosphorus pentahalide. Compounds containing both an arylmethoxy group and a halocarbonyl group my be prepared by converting compounds containing the former group into the corresponding halocarbonyl derivative.

Some functional groups are known to react with the halocarbonyl group or the catalyst used in the reaction. Examples include certain nitrogen-containing groups and hydroxyl groups. Therefore, such groups should generally be avoided as substituents to, or as part of the bridging hydrocarbyl groups A and B.

When aliphatic compounds containing at least one arylmethoxy group and at least one halocarbonyl group make up the monomeric system, benzyl ethers of glycolic acid chloride, propionic acid chloride and valeric acid chloride are preferred reactants. Benzyloxyacetyl chloride (hereinafter "BOAC") is the most preferred reactant. It produces polyglycolic polyester (also called polyglycolide).

Monomeric reactants comprising dibenzyl ether of butanediol together with a combination of adipoyl dichloride and terephthaloyl dichloride are preferred when the monomeric reactants are of type that include aliphatic compounds containing at least two arylmethoxy groups together with aromatic and/or aliphatic compounds containing at least two halocarbonyl groups.

Reaction conditions for preparing the aliphatic polyester are mild. The reaction temperature can be between 20° and 150° C. Below 20° C., the reaction is slow to initiate. Above 150° C., the reaction is generally too fast to be carried out safely. As it is a highly exothermic reaction, the reaction temperature quickly rises after initiation. Moreover, since the upper limit of the reaction temperature is close to the degradation temperature of some aliphatic polyesters, there is a considerable risk of thermal degradation of the polymer if it is exceeded. The reaction is preferably carried out at atmospheric pressure in an atmosphere inert to the reactants.

A catalytic amount of a Lewis acid is also used in this reaction. Generally, this is understood to be from about 0.1 to 5% wt (based on total weight of reactants and catalyst) of a Lewis acid. Particularly suitable Lewis acids are stannic tetrachloride, zinc dichloride, ferric chloride, aluminum chloride and boron bromide.

Sometimes the presence of a solvent is also desirable to decrease the catalytic activity to a suitable level. A suitable solvent does not react with the reactants or product, dissolves both the starting compounds and the resulting polymer, and is essentially inert vis-à-vis the catalyst. While it is true that some catalyst-solvent complexes will provide enhanced catalytic activity, most complexes render the catalyst ineffective. Halogenated hydrocarbons such as chlorobenzene and tetrachloroethane have proven effective as have aromatic hydrocarbons such as toluene and xylene.

High molecular weight polyglycolide is among the more important products produced according to the process of the present invention. The process herein disclosed and claimed presents a more cost effective and more specific alternative for producing this polymer than has heretofore been possible. Polyglycolides have many uses including the fabrication of sutures. Here they are particularly valuable since they are absorbed by random hydrolysis in tissue fluids. Polyglycolides are readily fashioned into such products as they may be melt spun into multifilament yarns. The method of the instant, invention may also provide an attractive route for preparing photo-crosslinkable polyesters, that require sequences of conjugated double bonds (chromophores).

EXAMPLE 1

Benzyloxyacetic acid, BOAA

Potassium-t-butylate (K$^t$Bu, 1.1 mol, 134 g) was dissolved in benzylalcohol (500 ml) under nitrogen and heated to 80° C. Then ethyl bromoacetate (1.0 mol, 167 g) was added in 0.5 hrs. After stirring for another 2 hrs., KOH (1.2 mol, 79 g) in water (100 ml) was added and the mixture stirred for 2 hrs. at 80° C. The solvent was subsequently evaporated at reduced pressure.

The residue was stirred with ethanol (400 ml) and filtrated. The filter cake was rinsed with ethanol (200 ml), diethylether (2×200 ml) and dissolved in water (400 ml). To the solution 33% HCl was added up to a pH of 2. The aqueous layer was subsequently extracted with diethylether, and the etherial layer was then extracted with water (2×200 ml) and dried over MgSO$_4$. The solvent was evaporated and the residue distilled. After a forerun of 5.2 g, 112 g (67%) of BOAA was collected.

Analytical data: bp. 132°–134° C./0.3 mm; $^1$H-NMR (CDCl$_3$): 4.15 (2H); 4.65 (2H); 7.36 (5H); 8.2 (OH).

Benzyloxyacetyl chloride, BOAC

SOCl$_2$ (0.15 mol, 17.9 g) was added (under nitrogen) to BOAA (0.05 mol, 8.31 g) in 1,1,2,2-tetrachloroethane (TCE, 10 ml). After standing for 16 hrs. at room temperature, the mixture was stirred at 60° C. for 2 hrs. At reduced pressure, the excess of SOCl$_2$ was distilled off together with TCE.

Analytical data: $^1$H-NMR: 7.41 (5H); 4.65 (2H) and 4.42 (2H).

Polyglycolic acid, polymer of benzyloxyacetyl chloride

SnCl$_4$ (0.2 g) was added to the above BOAC and the mixture was stirred at 60° C. for 1.5 hrs. The polymeric product was precipitated by addition of methanol (50 ml), after which it was collected by filtration. The remaining solid was further purified by again dissolving it in 80 ml of a 30/70 mixture of 1,1,1,3,3,3-hexafluoro-2-propanol (HF-ipa) and CHCl$_3$, and precipitating it with methanol (150 ml). After filtration, rinsing with CH$_2$Cl$_2$ and drying, 0.94 g (32%) of polyglycolic acid was obtained.

Analytical data: DSC (10° C./min): $T_m$=212° C., $T_c$=178° C. (4$^{th}$ run, sharpest peaks); microscopy (hot stage, crossed polarizers): consistent with DSC; $^1$H-NMR (CDCl$_3$/HF-ipa 2:3): 4.86 (End-groups not visible); and IR (nujol): 1736 cm$^{-1}$.

This example demonstrates a process for preparing aliphatic polyesters when the monomer system comprises an aliphatic compound containing at least one arylmethoxy group and at least one halocarbonyl group.

EXAMPLE 2

3-Benzyloxypropionic acid, BOPA

To a stirred solution of ethylacrylate (0.5 mol, 50.0 g) in benzylalcohol (2 mol, 216 g), K$^t$Bu (5 mmol, 0.61 g) was added at room temperature. After standing overnight, NaOH (0.55 mol, 22 g) in water (100 ml) was added. The solution was stirred for 2 hrs. at 50° C. and cooled to room temperature. Water (300 ml) was added and the mixture extracted with CH$_2$Cl$_2$ (1×500 ml, 4×150 ml). The aqueous layer was evaporated and the residue washed with diethylether (4×100 ml). The white solid was dissolved in water (300 ml) and acidified with 33% HCl up to a pH of 2. On cooling (0° C.), the acid solidified. It was filtrated, rinsed with cold water, and dissolved in diethylether. After drying over MgSO$_4$, the ether was evaporated. The acid was recrystallized from pentane/toluene and dried in a stream of nitrogen, resulting in 64.3 g (71%) of product.

Analytical data: mp. 35.2° C.; $^1$H-NMR (CDCl$_3$): 2.68 (2H$^{t,6.3}$); 3.77 (2H$^{t,6.3}$) 4.57 (2H); 7.35 (5H); 10.8 (OH).

3-Benzyloxypropionyl chloride, BOPC

SOCl$_2$ (0.10 mol, 12.0 g, freshly distilled) was added (under nitrogen) to BOPA (0,050 mol, 9.0 g), whereupon the mixture was left standing for 16 hrs at room temperature. TCE (10ml, distilled) was added and the reaction mixture was stirred for 1 hr. The excess of SOCl$_2$ together with TCE were distilled off at reduced pressure.

Analytical data (pure BOPC): $^1$H-NMR (CDCl$_3$): 3.14 (2H); 3.77 (2H) 4.54 (2H); 7.33 (5H).

Polymer of 3-benzyloxypropionyl chloride

SnCl$_4$ (0.5 ml of a solution of 4 g in 20 ml TCE) was added to the above 3-benzyloxypropionyl chloride and the mixture was stirred at 60° C. The acid chloride was found (by NMR) to be quantitative converted within 5 minutes. After stirring for 30 min., methanol (500 ml) was added.

The solvent was removed by decantation. The residue was dissolved in TCE (50 ml) and poured into methanol (200 ml). A nearly white precipitate was collected and dried in a stream of nitrogen, giving 2.65 g (74%) of polymer.

Analytical data: $^1$H-NMR (CDCl$_3$): 2.64 (2H), 4.35 (2H), (end groups not visible); IR (nujol): 1720–1738 cm$^{-1}$ (C=O, ester); Microscope (10° C./min): Complete isotropization at 87° C., crystallization started at 56° C.; DSC (10° C./min): T$_m$ 75° C. (no crystallization observed); M$_w$ (GPC):17,500.

This example demonstrates a process for preparing aliphatic polyesters when the monomer system comprises an aliphatic compound containing at least one arylmethoxy group and at least one halocarbonyl group.

EXAMPLE 3

1,4-Dibenzyloxybutane (DBOB)

K$^t$Bu (0.55 mol, 67,1 g) was dissolved in benzylalcohol (250 ml) at room temperature under nitrogen. Then 1,4-dibromobutane (0.25 mol, 54.0 g) was added in 1 hr at room temperature with stirring. The temperature was raised in 1 hr to 80° C. and stirring was continued for 7 hrs. After cooling, diethylether was added (200 ml) and the mixture extracted with water (3×200 ml). The etherial layer was dried over MgSO$_4$, and ether and excess of benzylalcohol were distilled off. The residue was filtrated over a column of silicagel (pentane/ether; 4:1) and the solvent evaporated. This sequence was repeated once, using pentane as eluens. After evaporation of the solvent, 32.0 g (47%) of pure product (DBOB) was obtained.

Analytical data: Mp. 18° C.; $^1$H-NMR (CDCl$_3$): 1.71 (4H); 3.49 (4H); 4.50 (4H); 7.32 (10H).

Copolymer of DBOB and terephthaloyl dichloride

Terephthaloyl dichloride (5.0 mmol, 1.015 g) and DBOB (5.0 mmol, 1.35 g) were dissolved in TCE (10 ml) and heated to 110° C. Then SnCl$_4$ (0.2 ml of a solution of 4 g in 20 ml TCE) was added and the mixture stirred. Benzyl chloride formation started immediately and within 30 min the conversion of DBOB was nearly complete. After stirring for another 4 hrs, methanol (100 ml) was added and the mixture filtrated. The solid was stirred with CH$_2$Cl$_2$ (100 ml). Again, methanol (100 ml) was added and the mixture filtrated. After drying, the polymer was stirred with CH$_2$Cl$_2$, filtrated and dried, resulting in 1.00 g (95%) of polymer.

Analytical data: DSC (10°/min): T$_m$=208° C. (broad), T$_c$=183° C. (sharp); Microscopy (hot stage, crossed polarizers): consistent with DSC; $^1$H-NMR (HF-ipa/CDCL$_3$, 1:5): 1.96 (4H), ca.4.40 (4H), 8.07 (4H); (end groups not visible); IR (nujol):1710 cm$^{-1}$.

Copolymer of DBOB and adipoyl dichloride

Adipoyl dichloride (freshly distilled, 0.01 mol, 1.83 g) and DBOB (0.01 mol, 1.35 g) were dissolved in TCE (8 ml). Then, at 60° C., SnCl$_4$ (0.2 ml of a solution of 4 g in 20 ml TCE) was added and the mixture stirred. After 15 minutes the conversion of DBOB was nearly complete and benzyl chloride was formed. After stirring for another hour, the reaction mixture was cooled to room temperature, methanol (150 ml) was added and the precipitated polymer was collected and dried in a stream of nitrogen (1.44 g, 76%).

Analytical data: $^1$H-NMR (CDCl$_3$):1.58–1.70 (8H), 2.30 (4H), 4.06 (4H) (end groups not visible); IR (nujol): 1738 cm$^{-1}$; M$_w$ (GPC):15,400.

This example demonstrates a process for preparing aliphatic polyesters when the monomer system comprises aliphatic compounds containing at least two arylmethoxy groups and compounds containing at least two halocarbonyl groups.

While this invention has been described in detail for the purpose of illustration, it is not to be construed or limited thereby but is intended to cover all changes and modifications within the spirit and scope thereof.

What is claimed is:

1. A process for preparing aliphatic polyesters by an acylative ether cleavage of monomer comprising:

at a temperature between about 20° and 150° C., contacting a catalytic quantity of Lewis acid with a monomer comprised of at least one C$_8$—C$_{24}$ aliphatic compound comprising at least one arylmethoxy group of the formula ArCR$_1$R$_2$O, wherein Ar is selected from the group consisting of benzyl and dibenzyl groups, R$_1$ and R$_2$ are each selected from the group consisting of hydrogen and C$_2$ to C$_6$ hydrocarbyl groups, said aliphatic compound further comprising at least one C$_2$—C$_6$ halocarbyl group of the formula

wherein X is a halogen atom;
polymerizing said monomer to form a polyester said polymerizing step occurring essentially without the presence of competing side reactions; and
recovering said polyester.

2. The process of claim 1, wherein said monomer is a bifunctional compound.

3. The process of claim 1, wherein said monomer contains one arylmethoxy group and one halocarbonyl group per molecule.

4. The process of claim 3, wherein said monomer is a compound having the formula ArCH$_2$OAOCX, wherein X is selected from the group consisting of chlorine and bromine, A is a C$_2$—C$_{20}$ inert aliphatic group.

5. The process of claim 1 wherein said monomer is selected from the group consisting of benzyloxyacetyl chloride and benzyloxypropionyl chloride.

6. The process of claim 1 wherein said Lewis acid is SnCl$_4$.

7. An aliphatic polyester produced according to the process of claim 1.

8. A process for preparing aliphatic polyesters by an acylative ether cleavage of monomers comprising:

contacting a catalytic quantity of Lewis acid with a monomer system comprised of at least two compounds, a first compound and a second compound, said first compound being a C$_8$—C$_{24}$ aliphatic compound having at least two arylmethoxy groups of the formula ArCR$_1$R$_2$O, wherein Ar is selected from the group consisting of benzyl and dibenzyl groups, $R_1$ and $R_2$ are each selected from the group consisting of hydrogen and $C_2$—$C_6$ hydrocarbyl groups;

said second compound being a compound selected from the group consisting of $C_8$—$C_{24}$ aromatic compounds and $C_8$—$C_{24}$ aliphatic compounds, said second compound further having at least two halocarbonyl groups of the formula $$\overset{O}{\underset{}{C-X}}$$

wherein X is a halogen atom;

polymerizing said monomer to form a polyester said polymerizing step occurring essentially without the presence of competing side reactions; and recovering said polyester.

9. The process of claim 8, wherein said first compound has the formula $ArCH_2OAOCH_2Ar$, wherein Ar is a $C_6$—$C_{24}$ aromatic group and A is a $C_2$—$C_{20}$ inert aliphatic group.

10. The process of claim 9, wherein said second compound has the formula $$\overset{O}{\underset{}{XC}}-B-\overset{O}{\underset{}{CX}}$$

wherein B is a $C_2$—$C_{20}$ bridging group, and X is chlorine or bromine.

11. The process of claim 8, wherein said monomer system comprises dibenzyloxybutane and a member of the group consisting of adipoyl dichloride and terephthaloyl dichloride.

12. The process of claim 8 wherein said Lewis acid is $SnCl_4$.

13. An aliphatic polyester produced according to the process of claim 8.

14. The process of claim 1 wherein said monomer is the product of a reaction between a benzyl ether and a member of the group consisting of glycolic acid chloride, propionic acid chloride, and valetic acid chloride.

15. The process of claim 8 wherein said monomeric reactants comprise dibenzyl ethers of butanediol and a member of the group consisting of adipoyl dichloride and terephthaloyl dichloride.

16. The process of claim 14 wherein said polymer is a polyglycolide.

* * * * *